United States Patent [19]

Mundt et al.

[11] 4,447,788

[45] May 8, 1984

[54] METHOD FOR OPTIMIZING THE POWER INPUT OF A PLURALITY OF HYSTERESIS MOTORS CONNECTED IN PARALLEL

[75] Inventors: Johann Mundt, Jülich-Koslar; Horst Kasper, Geilenkirchen; Eckhard Pritsch, Jülich-Koslar, all of Fed. Rep. of Germany

[73] Assignee: Uranit Uran-Isotopentrennungs-Gesellschaft mbH, Jülich, Fed. Rep. of Germany

[21] Appl. No.: 438,945

[22] Filed: Nov. 3, 1982

[30] Foreign Application Priority Data

Dec. 30, 1981 [DE] Fed. Rep. of Germany ....... 3151904

[51] Int. Cl.$^3$ .............................................. H02P 5/46
[52] U.S. Cl. ................................... 318/799; 318/808; 318/78; 318/701; 318/85
[58] Field of Search ................................ 318/798–803, 318/808, 805–807, 701, 714, 49, 78, 85

[56] References Cited

U.S. PATENT DOCUMENTS

| | | | |
|---|---|---|---|
| 3,619,749 | 11/1971 | Schieman | 318/798 |
| 3,619,750 | 11/1971 | Mokrytzki | 318/798 |
| 3,813,589 | 5/1974 | Boice | 318/701 X |

*Primary Examiner*—J. V. Truhe
*Assistant Examiner*—Patrick Keane
*Attorney, Agent, or Firm*—Spencer & Frank

[57] ABSTRACT

A method for optimizing the power input to a plurality of parallel connected hysteresis motors wherein a three phase alternating voltage source jointly supplies the motors with an adjustable operating voltage. The method includes measuring, during the operation of each motor, the phase angle difference between motor voltage and motor current and determining the power factor therefrom for each motor. The effective current value of each motor is measured during operation and is combined with the power factor to obtain the active current for each motor. An active current limit value at which each motor transitions from synchronous to asynchronous operation is measured once and stored for each motor prior to commencement of continuous synchronous operation. After the motors reach synchronous speed at rated voltage, the control voltage is adjusted to reduce the supply voltage to an optimum working point just above the voltage level at which a first one of the parallel connected motors begins to transition from synchronous to asynchronous operation. The active current of each motor is then compared with its associated limit value to determine whether it is operating synchronously or asynchronously. The control voltage of the voltage source is thereafter regulated for increasing the supply voltage to the rated voltage value when it is determined that one of the motors is operating asynchronously and for decreasing the supply voltage to the optimum working point when the motors are all determined to be operating synchronously.

3 Claims, 3 Drawing Figures

METHOD FOR OPTIMIZING THE POWER INPUT OF A PLURALITY OF HYSTERESIS MOTORS CONNECTED IN PARALLEL

BACKGROUND OF THE INVENTION

The invention relates to a method for optimizing the power input of a plurality of hysteresis motors connected in parallel.

In uranium enrichment plants, centrifuges are driven by hysteresis motors which are supplied with a medium-frequency three phase alternating voltage from, for example, a static frequency converter. In such arrangements the magnitude of the alternating voltage is regulated so that the maximum motor torque capable of being generated is greater, with a distinct safety margin, than the torque required by the method during synchronous running. The ratio of maximum torque to normal load torque is usually 1.5:1 when all motors are averaged, and 2:1 in the extreme case. This safety margin is necessary because many hundreds of centrifuge motors are supplied by one frequency converter, and synchronous operation must be ensured for all the centrifuges despite the variations occasioned during manufacture. Short term load increases may occur during operation of the plant because of malfunctions, during which the centrifuges are required to remain in synchronism. In addition, after a power supply failure, during which the centrifuges run down because of the lack of driving energy, an automatic return to synchronism is required in order to keep the interruption in operation as short as possible.

It is known from German Offenlegungsschrift (laid open application) No. 2 402 423, published Apr. 4th, 1976, and German Offenlegungsschrift No. 2 428 053, published May 20th, 1976, to monitor the synchronous running of each hysteresis motor in a plurality of parallel connected hysteresis motors, by means of a system which records the running thereof. Such systems use the phenomenon that the phase difference between motor current and motor voltage is dependent on motor load. The phase difference is used to determine the existence of a malfunctioning motor by detecting and evaluating the zero crossings of current and voltage for each individual motor and comparing the phase difference obtained therefor with a reference value which corresponds to the case of disturbed operation. For this purpose, the analog current signals coming from current transformers are initially converted into rectangular wave signals corresponding therewith in time, which signals are then supplied to a central evaluation logic via digital multiplexers. In the event of a malfunction, a signal giving the address of the malfunctioning motor is supplied to the central observation center.

This method requires that the output voltage of the power supply, which is produced by a static frequency converter, be kept constant within very narrow tolerances. If, however, in order to save energy, the output voltage of the frequency converter is to be adapted to the actual load condition of the motors, this method fails because identical phase relationships occur between current and voltage during both normal operation and during disturbed operation. Consequently the evaluation logic can no longer distinguish between these operating conditions.

SUMMARY OF THE INVENTION

It is an object of the present invention to reduce the power input of hysteresis motors, which are used, for example, to drive a plurality of centrifuges in a uranium enrichment system, to an optimum value without reducing the effective power of the enrichment system or its operational reliability.

The above and other objects and advantages are accomplished in accordance with the present invention wherein a method is provided for optimizing the power input to a plurality of parallel connected hysteresis motors of the same given rated voltage, wherein a three phase alternating voltage source jointly supplies the motors with an operating voltage that is adjustable within predetermined limits by means of a control voltage. The method includes measuring, during the operation of each motor, the phase angle difference between the voltage supplied to the motor and the motor current and determining the power factor from the measured phase angle difference for each motor. The effective value of the current of each motor is measured during operation and is combined with the power factor to obtain the active current component for each motor. An active current limit value at which each motor transitions from synchronous to asynchronous operation is measured once for each motor prior to commencement of continuous synchronous operation and this value is stored. Each motor is allowed to reach synchronous speed while maintaining the power supply at rated voltage. The control voltage is then adjusted to reduce the voltage jointly supplied to the motors to an optimum working point just above the voltage level at which a first one of the parallel connected motors begins to transition from synchronous to asynchronous operation, whereby the active and reactive power inputs are reduced to a substantially minimum value at the optimum working point. After the voltage supply is adjusted to the optimum working point the active current component of each motor is compared with a respective one of the stored active current limit values to determine as to each motor whether it is operating with its active current below the stored limit value and therefore operating synchronously or whether it is operating with its active current at or above the stored limit value and therefore operating asynchronously. The control voltage of the voltage source is thereafter regulated for increasing the voltage jointly supplied to the motors to the rated voltage value when it is determined that one of the motors is operating asynchronously and for decreasing the voltage jointly supplied to the motors to the optimum working point when the motors are all determined to be operating synchronously.

The particular advantages achieved with the proposed method are that the active power input of a system is reduced by approximately 15% and a considerable saving of energy is thereby achieved.

BRIEF DESCRIPTION OF THE DRAWINGS

The present invention will be described further, by way of example, with reference to the accompanying drawings, in which.

DESCRIPTION OF THE PREFERRED EMBODIMENT

Figure 1:
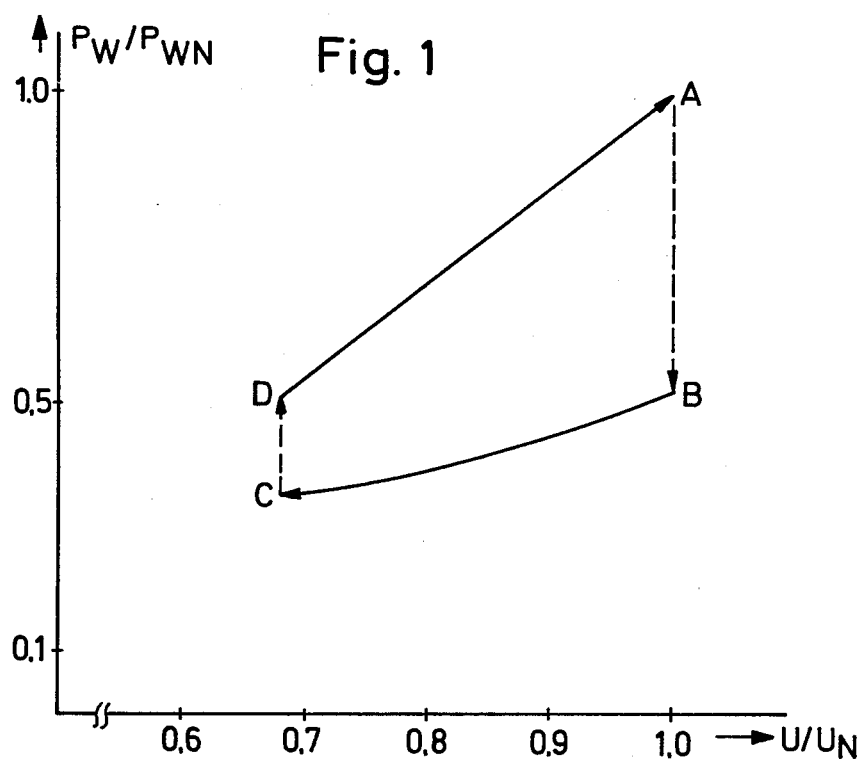
FIG. 1 shows active power as a function of motor voltage.

FIG. 1 illustrates the dependence of active electrical power $P_w$ received by a hysteresis motor on applied motor voltage U. The active power $P_w$ and motor voltage U are both normalized with respect to rated power $P_{wN}$ and rated voltage $U_N$, respectively. At Point A, the motor reaches it sychronous speed at its rated voltage $U_N$ and thereby receives rated active $P_{wN}$. At the point of synchronism, the active power $P_{wN}$ drops to approximately 50% of rated power $P_{wN}$ down to Point B. Point B corresponds to the presently customary working point during normal operation, that is, with the motor operating at its rated load.

If motor voltage U is continuously reduced, the motor remains in synchronism until working point C is reached. The received active $P_w$ thereby drops by approximately a further 15%. The main reason for this is that the reactive power input also declines and consequently the stator losses are reduced. Depending on motor voltage U, the working points of the hysteresis motor are therefore located on the curve B-C, the practical optimum working point being located close to or at Point C, which is the theoretical optimum working point.

If, however, the loading of the motor increases for some reason while the motor is operating close to or at the optimum Point C, the active power $P_w$ which the motor receives also increases, so that, if no countermeasures are taken, the motor would become asynchronous at Point D and would begin to run down.

Figure 2:
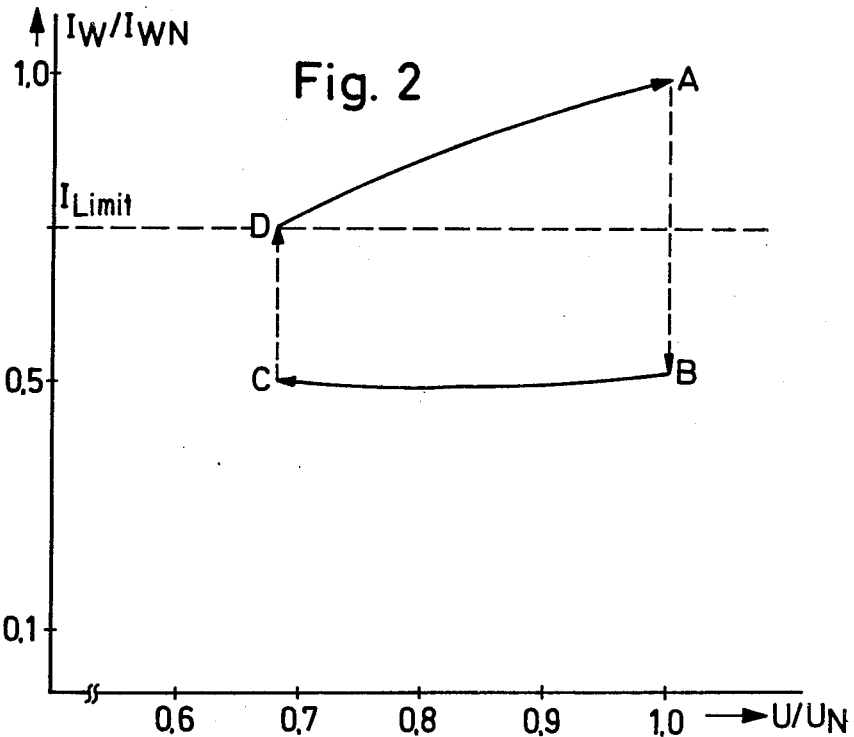
FIG. 2 shows active current as a function of motor voltage.

The present invention makes use of the fact that before the working point of the hysteresis motor reaches Point D, its active current input $I_w$ increases considerably. This can be seen from FIG. 2, which shows the dependence of active current $I_w$ (normalized with respect to rated active current $I_{wN}$) on normalized motor voltage $U/U_N$. Comparison of active motor current $I_w$ with a limit value $I_{limit}$, which may lie close to Point D, provides a direct criterion for detecting increased loading. By monitoring the active current $I_w$ of the motor and providing a regulating process for adjusting the motor voltage U upward upon an indication of such increased loading, the working point of the motor is controlled to move towards Point A, where the motor again generates its full torque. Once the malfunction has been overcome and normal load operation is restored, the motor will initially adopt working point B. The monitoring system, however, detects the now reduced active current input $I_w < I_{limit}$ and restores the motor voltage U to that at Point C. The motor thus returns to its normal operating condition with optimum active power input.

The method according to the invention therefore does not use the phase relationship between motor current I and motor voltage U as a criterion for the operating condition of each one of the plurality of parallel connected motors, as is the case with the prior art description in German Offenlegungsschrift No. 2 402 423 and German Offenlegungsschrift No. 2,428,053. Rather, the present invention uses the active current component $I_w$ of the respective motors currents I. These active components $I_w$ are formed from the equation $I \cdot \cos \theta$, where $\theta$ is the phase angle between motor current and voltage during operation. In the case of hysteresis motors during synchronous operation the active current components $I_w$ are substantially independent of the applied voltage U and only change in dependence on the loading of the motor.

With the information obtained by the monitoring system the alternating voltage U of the voltage supply is increased or decreased in accordance with the proposed method for all the connected motors by a regulating means such that the torque is adapted in optimum manner to the actual load, even for those motors which, due to manufacturing variations, have the lowest torque, and for all other operating conditions of the system. Consequently, even the motor which is in the most disadvantageous position in the tolerance range receives the motor voltage U and therewith the electrical power $P_w$ which is necessary to just keep its centrifuge in synchronous running. Thus, all of the connected motors receive just that amount of power which is required as a minimum for reliable operation.

Figure 3:
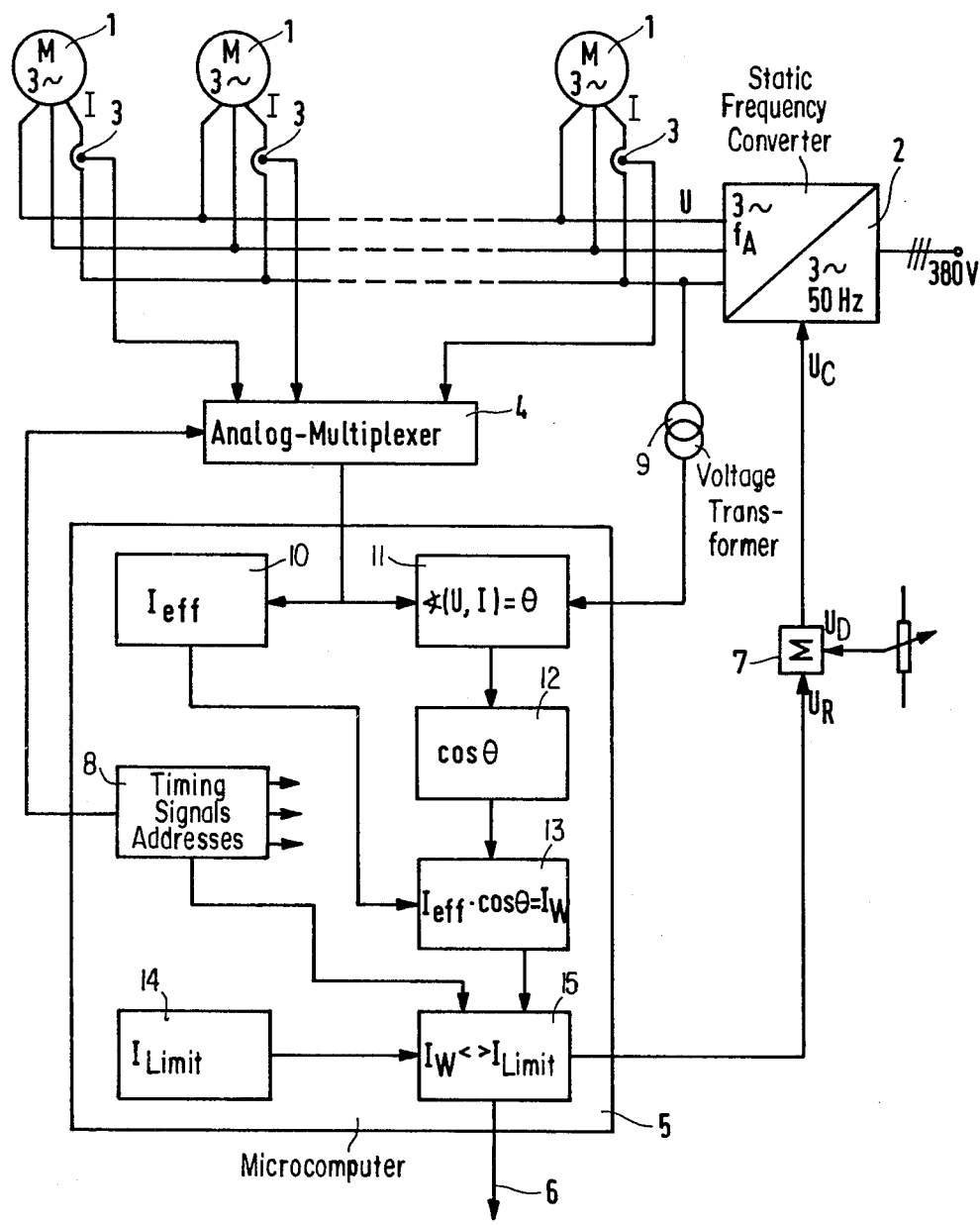
FIG. 3 is a block diagram of a device, including a regulating means for adjusting motor voltage, which operates according to the method of the invention.

FIG. 3 shows a block diagram of a system for monitoring the active currents of a plurality of parallel connected three phase hysteresis motors 1 and for regulating the motor voltage U provided by a voltage controlled static frequency converter 2 which produces a three phase alternating voltage output. Each hysteresis motor 1 has a current transformer 3 in one phase of its three-phase current connection. Each of the current transformers 3 is connected to one of the inputs of an analog multiplexer 4 which sequentially switches the current transformer signals to the analog input of a microcomputer 5. Timing signals produced at 8 by microcomputer 5 control the switching of multiplexer 4. Other timing signals indicated by the three short arrows at 8 control, in a known manner, the various processing steps described below.

The current transformer signals are processed at 10 in microcomputer 5 to determine an effective current value $I_{eff}$ (rms value) for each motor 1. Line voltage U is fed via voltage transformer 9 to microcomputer 5 which determines at 11 the respective phase angles $\theta$ between motor voltage U and the respective motor currents I. This is done by time comparing the zero passages of voltage U and respective currents I in a known manner. The power factor ($\cos \theta$) for each motor is then calculated or obtained from a read only memory at 12 and combined at 13 with the corresponding effective current value $I_{eff}$ to obtain an active current value $I_w = I_{eff} \cos \theta$ In a separate sensing cycle prior to continuous synchronous operation of motors 1, a single measurement is made for each motor 1 to determine an active current limit value $I_{limit}$ at which each motor 1 transitions from asynchronous to synchronous operation. The $I_{limit}$ value for each motor is deposited in a memory at 14.

The active current value $I_w$ of each of the hysteresis motors 1 during operation is compared at 15 with the corresponding $I_{limit}$ value. From this comparison microcomputer 5 forms a regulating voltage $U_R$ which is added, in an adder 7, to a predetermined desired voltage value $U_D$ to produce a control voltage $U_C$ which is supplied to static frequency converter 2. Desired voltage $U_D$ is preset so that, in the absence of a malfunction by any one of the motors 1 or microcomputer 5, control voltage $U_C$ causes static frequency converter 2 to produce an output voltage U sufficient to maintain motors 1 at an optimum working point close to point C in FIG. 1. If microcomputer 5 detects a malfunctioning motor, regulating voltage $U_R$ thereby produced causes a change in control voltage $U_C$ which raises the voltage U of static frequency converter 2 to rated voltage $U_N$. Also, in the event of a malfunction in microcomputer 5, an autonomously operating subprogram is provided to ensure that static frequency converter 2 sets its output voltage U to the rated value $U_N$.

When active current $I_w$ for any motor reaches or exceeds active current limit value $I_{limit}$, a malfunction report is produced at an output 6 of microcomputer 5. The malfunction report contains the address of the malfunctioning motor, which address is obtained from a memory at 8 in microcomputer 5.

It will be understood that the above description of the present invention is susceptible to various modifications, changes and adaptions, and the same are intended to be comprehended within the meaning and range of equivalents of the appended claims.

What is claimed is:

1. A method for optimizing the power input to a plurality of parallel connected hysteresis motors all having the same given rated voltage, wherein a three phase alternating voltage source jointly supplies the motors with operating voltage, the voltage source being adjustable within predetermined limits by means of a control voltage, said method comprising:
   (a) measuring, during the operation of each parallel connected motor, the phase angle difference between the voltage supplied to the motor and the motor current;
   (b) determining the power factor from the measured phase angle difference for each motor;
   (c) measuring the effective value of the current of each motor during operation;
   (d) combining the respective effective current values and power factors to determine the active current component for each motor during operation;
   (e) measuring and storing the limit value of the active current component at which each motor transitions from synchronous to asynchronous operation, said limit value measuring and storing being conducted only once for each motor prior to commencement of continuous synchronous operation;
   (f) allowing each motor to reach synchronous speed while maintaining the supply voltage at rated voltage;
   (g) while maintaining synchronous speed, adjusting the control voltage of the voltage supply to reduce the voltage jointly supplied to the motors from rated voltage to an optimum working point which is close to the voltage level at which a first one of said parallel connected motors begins to transistion from synchronous to asynchronous operation, whereby the active and reactive power inputs are reduced to a substantially minimum value at the optimum working point;
   (h) comparing the active current component of each motor, after said adjusting step, with a respective one of the stored active current component limit values to determine as to each motor whether it is operating with its active current below the stored limit value and therefore operating synchronously or whether it is operating with its active current at or above the stored limit value and therefore operating asynchronously; and
   (i) regulating the control voltage of the voltage source for increasing the voltage jointly supplied to the motors to the rated voltage value when said comparing step determines that one of said motors is operating asynchronously and for decreasing the voltage jointly supplied to the motors to the optimum working point when the motors are all determined to be operating synchronously.

2. A method according to claim 1 wherein at the optimum working point said control voltage is a preset desired control voltage, and said regulating step for increasing the supply voltage to rated voltage includes adding a regulating voltage component to the preset desired control voltage such that the supply voltage is increased to rated voltage.

3. A method according to claim 1 further including the step of storing an address identifying each motor and said comparing step further includes the step of providing a signal indicating the address of the motor determined to be operating asynchronously.

* * * * *